United States Patent

Sefranek

(10) Patent No.: US 9,176,015 B1
(45) Date of Patent: Nov. 3, 2015

(54) POINT LOAD SENSOR

(75) Inventor: Jeffrey K. Sefranek, Charlestown, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 940 days.

(21) Appl. No.: 13/368,714

(22) Filed: Feb. 8, 2012

(51) Int. Cl.
*G01L 1/00* (2006.01)
*G01L 1/22* (2006.01)

(52) U.S. Cl.
CPC .................................... *G01L 1/22* (2013.01)

(58) Field of Classification Search
CPC .......................................................... G01L 1/22
USPC ............................................................ 702/42
See application file for complete search history.

(56) References Cited

U.S. PATENT DOCUMENTS

| | | | |
|---|---|---|---|
| 6,766,697 B1* | 7/2004 | Perez et al. | 73/800 |
| 2005/0187736 A1* | 8/2005 | Wanami et al. | 702/173 |
| 2009/0210173 A1* | 8/2009 | Arms et al. | 702/42 |

OTHER PUBLICATIONS

Hearn, Mechanics of Materials vol. 1: An Introduction to the Mechanics of Elastic and Plastic Deformation of Solids and Structural Materials, Butterworth-Heinemann, Jul. 9, 1997, pp. 198-214.*

* cited by examiner

*Primary Examiner* — Janet Suglo
*Assistant Examiner* — Michael Dalbo
(74) *Attorney, Agent, or Firm* — James M. Kasischke; Michael P. Stanley

(57) ABSTRACT

A point load sensor measures compressive forces exerted on the outside of a ring in diametric compression irrespective of the direction of application of the force. The sensor consists of a ring with strain gauges placed in a configuration to measure the circumferential strain at two positions on the ring ninety degrees apart resulting from bending of the ring as the ring is loaded in diametric compression. The two measurements are corrected and combined to recover the compressive force on the ring. A method for calibrating and resolving the compressive force does not require the angle of loading or sensor orientation as an input, thus allowing resolution irrespective of the direction of the compressive force.

1 Claim, 4 Drawing Sheets

POINT LOAD SENSOR

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

Not applicable.

BACKGROUND OF THE INVENTION (1) Field of the Invention

The present invention relates to load sensors and more particularly to a sensor for measuring forces exerted on a ring in diametric compression.

(2) Description of the Prior Art

During the handling of cabling, piping, or other tubular materials, forces are applied to the material by the handling system that can be difficult to measure. As an example, thin line sonar arrays that are towed behind submarines.

As the arrays are deployed from and retrieved, the array passes through various parts of the handling system. Any problems with the towed array handling system may result in the application of unacceptable forces to the array that can damage the array.

When using the known Guide To Measurement Module (GTMM), squeeze forces on towed arrays are measured. Specifically, the measurement module contains a sensor in the form of a ring instrumented with strain gauges. The placement of the gauges within the ring provides two outputs proportionate to the applied force. These outputs are combined using a vector sum approach.

However, the design of this sensor does not take into consideration the variation of strain inside a ring under diametric compression. Without this consideration, the placement and wiring of the strain gauges, as well as the means of combining the outputs, can result in orientation errors greater than thirty percent.

What are therefore needed is a system and method of use for measuring compressive forces exerted on tubular material during handling. The system needs to account for the mechanics of strain inside a ring under diametric compression.

SUMMARY OF THE INVENTION

It is therefore a general purpose and primary object of the present invention to provide a sensor for measuring compressive forces exerted on tubular material during handling.

It is a further object of the present invention to provide a system and method of use that incorporates the mechanics of strain within the sensor when determining such compressive forces.

It is a still further object of the present invention to provide a system and method of use for reducing sensor orientation errors.

To attain the above and other objects described above, a sensor is provided, which measures compressive forces exerted on the outside of a ring in diametric compression irrespective of the direction of application of the force. The sensor comprises a ring with strain gauges placed in a configuration to measure the circumferential strain at two positions on the ring at ninety degrees apart (resulting from bending of the ring as the ring is loaded in diametric compression).

The two strain measurements are corrected and combined to recover the compressive force on the ring. The sensor employs a method for calibrating and resolving the compressive force that does not require the angle of loading or sensor orientation as an input; thereby, allowing resolution irrespective of the direction of the compression. Accordingly, the method results in the reduction of sensor orientation errors.

In one embodiment, a method for calibrating a sensor ring measuring an unknown diametric compressive force, P, includes applying a known load, $P_K$, at a plurality of orientations about the sensor ring. A set of first and second output voltages ($V_A$ and $V_B$) are measured across respective first and second output connections from respective first and second strain gauges of pairs of biaxial strain gauges circumferentially spaced apart on the ring.

Values for slopes ($m_A$ and $m_B$) and for offsets ($b_A$ and $b_B$) are initialized with the slopes being assumed as "1" and the offsets as "0" and a corresponding set of parameters ($V_1$ and $V_2$) are calculated based on the relationships $V_1 = m_A V_A b_A$ and $V_2 = m_B V_B + b_B$. A set of uncorrected loads, UP, is initially calculated based on the relationship derived from the strain relations for a thin ring:

$$UP = \frac{-\left(\frac{4(V_1+V_2)}{\pi}\right) + \sqrt{\frac{16}{\pi^2}(V_1+V_2)^2 - 4\left(\frac{8-\pi^2}{\pi^2}\right)(V_1^2+V_2^2)}}{2\left(\frac{8-\pi^2}{\pi^2}\right)}. \quad [1]$$

The standard deviation for the set of uncorrected loads is obtained. The values of one or more of the slopes or offsets are iteratively varied until the standard deviation of UP is minimized.

The relationship for UP can be generalized to $UP = A(V_1 + V_2) + \sqrt{B(V_1+V_2)^2 - C(V_1^2+V_2^2)}$. The coefficients A, B and C can be initialized assuming their corresponding values based on the assumption of a thin ring and iteratively varied along with the slopes and offsets; thereby, allowing generalization to rings that may not be thin.

Once the standard deviation is minimized, the load, $P_K$, can be varied at a few sensor orientations to obtain a set of $P_K$ versus UP values. A best fit curve for the set of $P_K$ versus UP values load can be determined.

In one embodiment, a sensor ring calibration includes the steps of calibrating the sensor ring for load orientation and calibrating the sensor ring output for deviations from linearity. Calibrating the sensor ring for load orientation can further include minimizing a standard deviation of an uncorrected load, UP, wherein:

$$UP = \frac{-\left(\frac{4(V_1+V_2)}{\pi}\right) + \sqrt{\frac{16}{\pi^2}(V_1+V_2)^2 - 4\left(\frac{8-\pi^2}{\pi^2}\right)(V_1^2+V_2^2)}}{2\left(\frac{8-\pi^2}{\pi^2}\right)};$$

$V_1 = m_A V_A + b_A$;
$V_2 = m_B V_B + b_B$;
$m_A$ and $m_B$ are slope constants;
$b_A$ and $b_B$ are offset constants; and
$V_A$ and $V_B$ are output voltages across respective pairs of biaxial grid strain gauges circumferentially spaced ninety degrees apart on the ring.

Calibrating a sensor ring for deviations from linearity can further include varying the load, $P_K$, applied to the sensor ring at a few sensor orientations and determining a best fit curve for the set of $P_K$ versus uncorrected load, UP, values.

Calibrating the sensor ring for load orientation can further include minimizing a standard deviation of an uncorrected load, UP, wherein:

$$UP = A(V_1+V_2) + \sqrt{B(V_1+V_2)^2 - C(\overline{V_1^2+V_2^2})}; \qquad [2]$$

A, B and C are constants;
$V_1 = m_A V_A b_A$;
$V_2 = m_B V_B b_B$;
$m_A$ and $m_B$ are slope constants;
$b_A$ and $b_B$ are offset constants; and
$V_A$ and $V_B$ are output voltages across respective pairs of biaxial grid strain gauges circumferentially spaced ninety degrees apart on the ring.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE INVENTION

Figure 1:
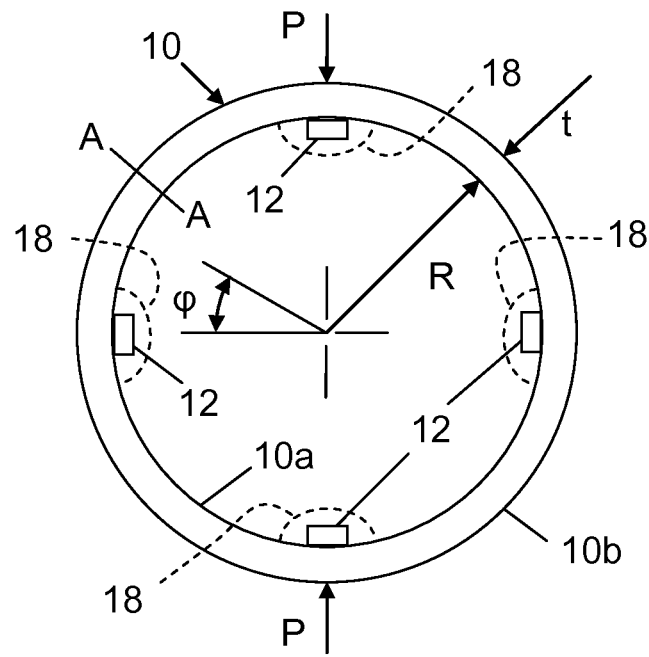
FIG. 1 depicts a sensor ring in diametric compression.

Referring to FIG. 1, there is shown a sensor ring 10, with an inner radius R and a thickness t. Diametrically opposed forces P are applied to the sensor ring 10, such that the sensor ring is placed in diametric compression. As is known in the art, there will be a bending moment through the thickness, t, of the sensor ring 10 at all points from this type of loading.

Considering a bending moment M at some angle φ, it is known in the art that the following relationship holds for a thin ring:

$$M = \frac{P \cdot R}{2}\left(\cos(\varphi) - \frac{2}{\pi}\right), \quad \frac{-\pi}{2} \le \varphi \le \frac{\pi}{2}. \qquad [3]$$

It has also been shown in the art that the use of Equation [3] for thick rings is often sufficient. For thick rings having section thickness to radius ratios (t/R) as great as ½, the error introduced by the use of Equation [3] is approximately four percent.

From Equation [3], it can be surmised that the strain inside of the sensor ring 10 will be:

$$\varepsilon = \frac{P \cdot R \cdot t}{4 \cdot E \cdot I}\left(\cos(\varphi) - \frac{2}{\pi}\right), \qquad [4]$$

where:
ε=strain;
E=Young's modulus for the ring material; and
I=moment of inertia of a section of the ring that is in bending.

However, the sensor ring 10 will measure some voltage, $V_A$, that is directly related to strain through a constant, $C_1$. Therefore, the relationship becomes:

$$V_A = \frac{P \cdot R \cdot t}{4 \cdot C_1 \cdot E \cdot I}\left(\cos(\varphi) - \frac{2}{\pi}\right), \qquad [5]$$

It is noted that the quantity $$\frac{R \cdot t}{4 \cdot C_1 \cdot E \cdot I}$$

is a constant that transforms the load, P, into a voltage. Accordingly, the quantity $$\frac{P \cdot R \cdot t}{4 \cdot C_1 \cdot E \cdot I}$$

(referred to hereinafter as V) has units of volts and is directly proportional to the load P.

The constant relating V to the load P can be determined during sensor calibration. The problem remains that since the direction of the load on sensor ring 10 is arbitrary and unknown, there is not enough information in the above equation to determine V.

Thus, it is necessary to measure strain in at least one other direction. For purposes of derivation and illustration, but not limitation, the strain can be measured at locations circumferentially ninety degrees apart. Those of skill in the art will recognize that separations other than ninety degrees can be used. However, the use of ninety degrees separations simplifies the derivations of the equations described hereinafter.

For the illustrative embodiment of FIG. 1, but not limitation, strain gauges 12 are mounted on inner surface 10a of the sensor ring 10 and are spaced circumferentially ninety degrees apart. Those of skill in the art will also recognize that the methods described hereinafter are equally applicable to strain gauges located on outer surface 10b of the sensor ring 10, or within thickness, t, of the sensor ring.

Figure 2:
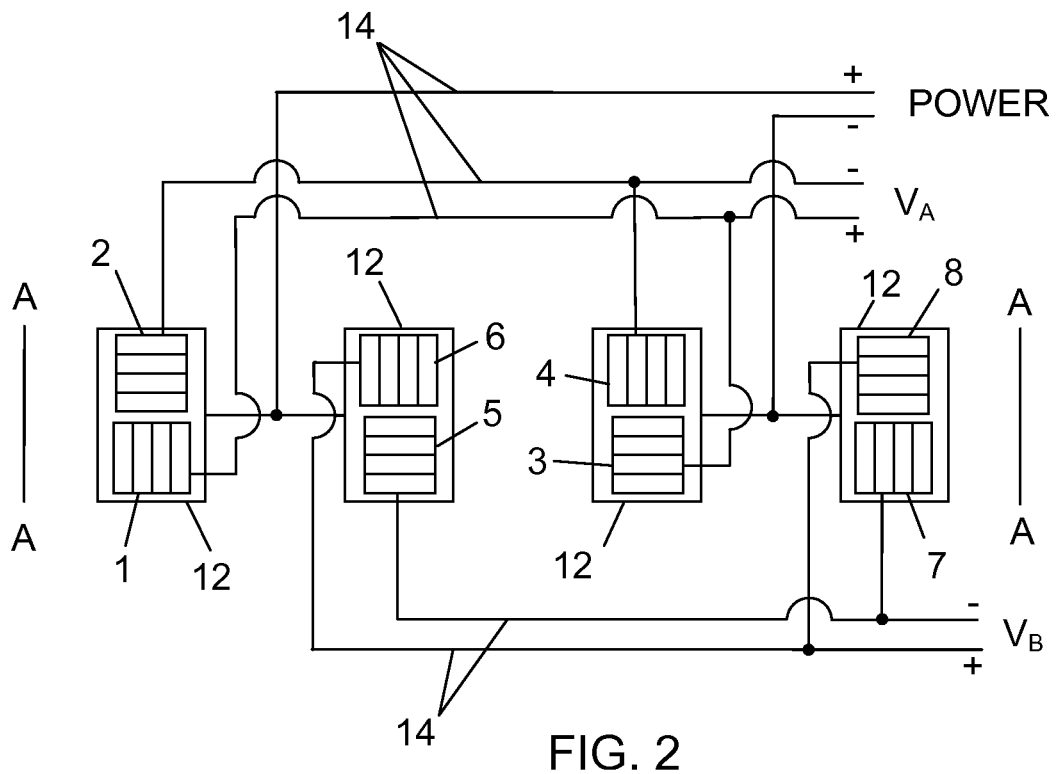
FIG. 2 depicts a developed view of strain gauge connections for the sensor ring of FIG. 1.

Referring also to FIG. 2, there is shown a developed view of strain gauges 12 illustrating connections or wiring 14 between the gauges. For clarity, only some of connections 14 are designated in FIG. 2. The developed view of FIG. 2 corresponds to a panoramic view of inner surface 10a of sensor ring 10, from match line A-A, about the circumference and back to match line A-A.

As is typical of strain gauges used in the art, each gauge 12 has two grids orthogonal to one another. For ease of further discussion, the grids are labeled 1 through 8. Grids 2, 3, 5 and 8 are aligned in the circumferential direction of the sensor ring 10 and grids 1, 4, 6 and 7 are aligned in the axial direction of the sensor ring. Each gauge 12 is wired to another gauge displaced circumferentially 180°, (i.e., grids 1-2 are connected to grids 3-4 and grids 5-6 are connected to grids 7-8). Power is provided to grids 1-2 and 5-6 and returned from grids 3-4 and 7-8. Any combination of these four strain gauges may be rotated 180 degrees and installed upside down.

Figure 3:
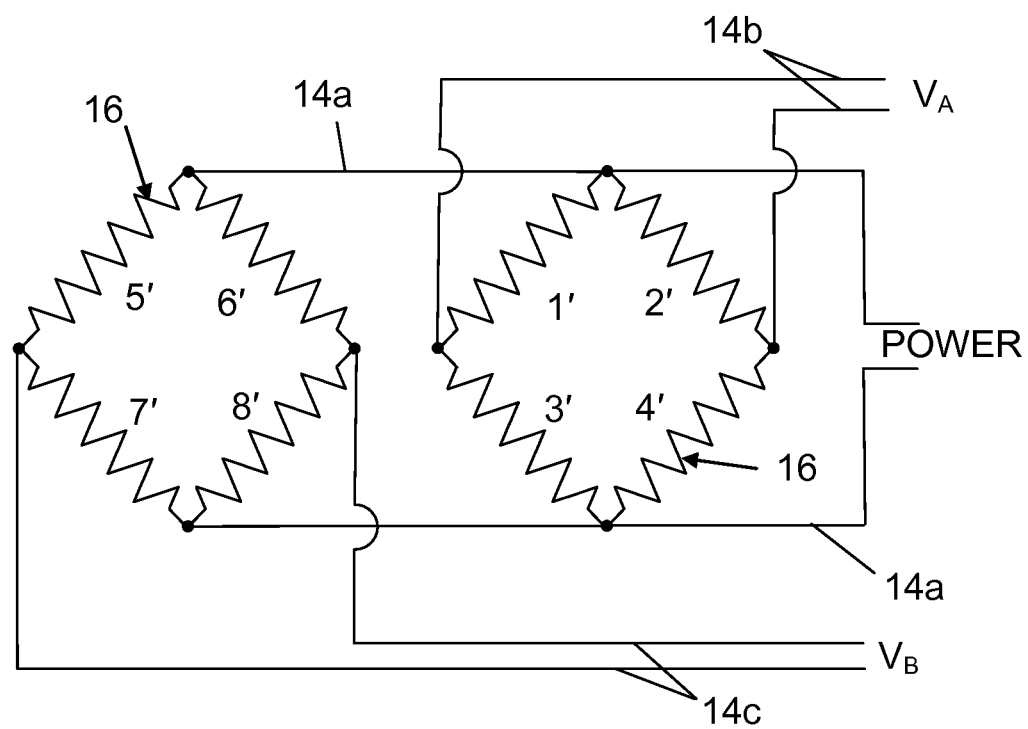
FIG. 3 illustrates a wiring diagram corresponding to the connections of FIG. 2.

FIG. 3 illustrates the wiring diagram corresponding to FIG. 2. As shown in FIG. 3, the wiring of grids 1 through 8 corresponds to two full Wheatstone bridge configurations, wherein the elements 1'-8' of Wheatstone bridges 16 are labeled corresponding to grids 1-8 of FIG. 2. Accordingly, power is provided by wiring 14a, $V_A$ is obtained by wiring 14b from elements 1'-2' and 3'-4' and $V_B$ is obtained by wiring 14c from elements 5'-6' and 7'-8'.

Since strain inside the sensor ring 10 is symmetric, the strains that are measured 180° circumferentially apart from one another will be equal. Accordingly, the gauges 12 that are separated by 180° measure the same strain and are wired so that their outputs are added. The result is a circuit that is sensitive to circumferential strain, but not to temperature or hydrostatic pressure. The two pairs of the strain gauges 12 make for two circuits sensitive to strain at points inside the sensor ring 10 separated by ninety degrees.

Measuring strain ninety degrees (90°) apart results in the following equations:

$$V_A = \left(\cos(\varphi) - \frac{2}{\pi}\right); \qquad [6]$$

$$V_A = V\left(\cos\left(\varphi - \frac{\pi}{2}\right) - \frac{2}{\pi}\right). \qquad [7]$$

Referring to FIGS. 2 and 3, $V_A$ is taken across grids 1-3 and 2-4, while $V_B$ is taken across grids 6-8 and 5-7. The unknowns are the angle $\varphi$ and the V quantity. It remains simply to solve the above simultaneous equations so as to determine the theoretical voltage, V, in terms of the measured voltages ($V_A$ and $V_B$).

This can be accomplished by first solving both equations for the angles:

$$\varphi - \frac{\pi}{2} = \cos^{-1}\left(\frac{V_B}{V} + \frac{2}{\pi}\right); \qquad [8]$$

$$\varphi = \cos^{-1}\left(\frac{V_A}{V} + \frac{2}{\pi}\right). \qquad [9]$$

Subtracting the bottom equation from the top eliminates the unknown angle $\varphi$:

$$-\frac{\pi}{2} = \cos^{-1}\left(\frac{V_B}{V} + \frac{2}{\pi}\right) - \cos^{-1}\left(\frac{V_A}{V} + \frac{2}{\pi}\right). \qquad [10]$$

Taking the cosine of both sides of the above equation yields:

$$0 = \cos\left(\cos^{-1}\left(\frac{V_B}{V} + \frac{2}{\pi}\right) - \cos^{-1}\left(\frac{V_A}{V} + \frac{2}{\pi}\right)\right). \qquad [11]$$

Applying the known trigonometric identity for cos(a−b) yields:

$$\cos\left(\cos^{-1}\left(\frac{V_B}{V} + \frac{2}{\pi}\right)\right) \cdot \cos\left(\cos^{-1}\left(\frac{V_A}{V} + \frac{2}{\pi}\right)\right) + \qquad [12]$$

$$\sin\left(\cos^{-1}\left(\frac{V_B}{V} + \frac{2}{\pi}\right)\right) \cdot \sin\left(\cos^{-1}\left(\frac{V_A}{V} + \frac{2}{\pi}\right)\right) = 0.$$

Equation [12] is equivalent to the following expression:

$$\left(\frac{V_B}{V} + \frac{2}{\pi}\right) \cdot \left(\frac{V_A}{V} + \frac{2}{\pi}\right) + \qquad [13]$$

$$\left(\sqrt{1 - \left(\frac{V_B}{V} + \frac{2}{\pi}\right)^2}\right) \cdot \left(\sqrt{1 - \left(\frac{V_A}{V} + \frac{2}{\pi}\right)^2}\right) = 0$$

By moving those terms under a square root to the other side of the equation, squaring both sides of the equation, and then collecting like terms on one side of the resultant equation; Equation [13] can be rewritten as:

$$\frac{V_B^2}{V^2} + \frac{4V_B}{\pi V} + \frac{4}{\pi^2} + \frac{V_A^2}{V^2} + \frac{4V_A}{\pi V} + \frac{4}{\pi^2} - 1 = 0. \qquad [14]$$

Grouping terms; Equation [14] can be written as:

$$\frac{V_A^2 + V_B^2}{V^2} + \frac{4}{\pi} \frac{(V_A + V_B)}{V} + \frac{8 - \pi^2}{\pi^2} = 0. \qquad [15]$$

Multiplying through by $V^2$, a quadratic equation in V is obtained:

$$\left(\frac{8 - \pi^2}{\pi^2}\right) V^2 + \left(\frac{4(V_A + V_B)}{\pi}\right) V + (V_A^2 + V_B^2) = 0. \qquad [16]$$

As is known in the art, quadratic Equation [16] has two possible solutions. Using Equations [6] and [7], values for $V_A$ and $V_B$ are generated given many values for $\varphi$ at small intervals. The generated values for $V_A$ and $V_B$ are plugged into each of the two solutions to Equation [16]. The one solution that produces real numbers for all values of $V_A$ and $V_B$ is determined to be the correct solution of Equation [16]. Based on the above, the correct solution is:

$$V = \frac{-\left(\frac{4(V_A + V_B)}{\pi}\right) + \sqrt{\frac{16}{\pi^2}(V_A + V_B)^2 - 4\left(\frac{8 - \pi^2}{\pi^2}\right)(V_A^2 + V_B^2)}}{2\left(\frac{8 - \pi^2}{\pi^2}\right)}. \qquad [17]$$

As stated earlier, V (Equation [17]) is directly proportional to the point load of P. Ideally, V can be multiplied by some factor in order to recover the point load of P. However, this is based on the output voltages of the sensor ring 10 (both reading a value of zero with no load on the gauges and both pairs of gauges having the same sensitivities to load).

In actuality, it is not always possible to zero Wheatstone bridge circuits 16. Typically, the outputs have different offset voltages due to small differences in the construction and bonding of each strain gauge 12. The offset voltages have a tendency to drift over the life of the sensor, requiring periodic corrections. In addition, the sensitivities of the bridge circuits 16 are not identical due to small misalignments of the strain gauges 12 and differences in their bonding.

The above effects can be compensated for by correcting the voltages as in the following equations:

$$V_1 = m_A V_A + b_A; \qquad [18]$$

$$V_2 = m_B V_B + b_B. \qquad [19]$$

By choosing proper values for correction slopes ($m_A$ and $m_B$) and offsets ($b_A$ and $b_B$); the results can be used in Equation [17] to recover the point load directly:

$$UP = \frac{-\left(\frac{4(V_1+V_2)}{\pi}\right) + \sqrt{\frac{16}{\pi^2}(V_1+V_2)^2 - 4\left(\frac{8-\pi^2}{\pi^2}\right)(V_1^2+V_2^2)}}{2\left(\frac{8-\pi^2}{\pi^2}\right)}, \quad [20]$$

where UP designates the uncorrected point load of P.

For orientation calibration, a known point load, $P_K$, can be applied to the sensor ring 10 and the output voltages $V_A$ and $V_B$ can be measured. Load $P_K$ can be applied at many different orientations to obtain a set of paired values for $V_A$ and $V_B$. For example, applying load $P_K$ to the sensor ring 10 every fifteen degrees yields twenty-four paired values for $V_A$ and $V_B$.

Initial values for correction slopes, $m_A = m_B = 1$, and correction offsets, $b_A = b_B = 0$, are chosen such that $V_1 = V_A$ and $V_2 = V_B$. The paired values are plugged into Equation [20] to produce a corresponding set of values for UP. The standard deviation of the set of values for UP can be determined, which is a measure of the sensor ring 10 error due to varying orientation of the sensor ring when loaded. The standard deviation is minimized by iteratively varying the calibration coefficients, $m_A$, $m_B$, $b_A$ and $b_B$.

By minimizing the standard deviation, the resulting set of values for UP contains minimal error. However, the resulting values are not necessarily equal to the point load, P. To obtain the point load, P; the calibration coefficients can be scaled by a common factor with no effect on the orientation error.

Given the previously determined coefficients, $m_A$, $m_B$, $b_A$ and $b_B$, the sensor ring 10 can be loaded with various point loads, P, and a plot of UP versus P can be obtained. Ideally, the resultant curve will be linear and a straight line could be drawn through all points. A linearity error can be minimized by applying a best fit curve to the data and correcting UP using these results. As an example, but not for limitation, a linear correction can be applied, resulting in the following:

$$P = M \cdot UP + Y, \quad [21]$$

with coefficients M and Y determined from the best fit linear curve.

In many applications, the sensor ring 10 is exposed to harsh environments and abrasive handling. To protect the sensor ring 10 and the gauges 12, a layer of hard epoxy or similar material can be applied over strain gauges 12 (as shown in phantom by coating 18 in FIG. 1). While the protective coating 18 allows sensor ring 10 to remain operational during extreme conditions, the coating causes the orientation error of the sensor ring to increase.

As described previously herein, Equation [20] is derived from strain equations for thin rings, wherein the strain is measured inside the ring. The coating 18 over the strain gauges 12 results in an effectively thicker sensor ring 10. In addition, with the strain gauges 12 embedded in the coating 18, strain is no longer being measured on the inside surface 10a. Both these factors contribute to the increased orientation error.

However, the general form of Equation [20] can still apply. As can be seen from examination of Equation [20], there are a large number of constants. As such, Equation [20] can be rewritten as follows:

$$UP = A(V_1+V_2) + \sqrt{B(V_1+V_2)^2 - C(V_1^2+V_2^2)}, \quad [21]$$

Using Equation [22], calibration now can be accomplished by using the previously described initial values for correction slopes, $m_A = m_B = 1$, and correction offsets, $b_A = b_B = 0$ and by using initial values for the coefficients A, B, and C of $A = -(4/\pi)$, $B = (4/\pi)^2$ and $C = 4(1-8/\pi^2)$. The calibration technique is unchanged except that the coefficients, A, B, and C, must now also be determined using standard iteration tools. Accordingly, Equations [18], [19], [22] and [11] are the basis for the design and calibration of the sensor ring 10.

Figure 4:
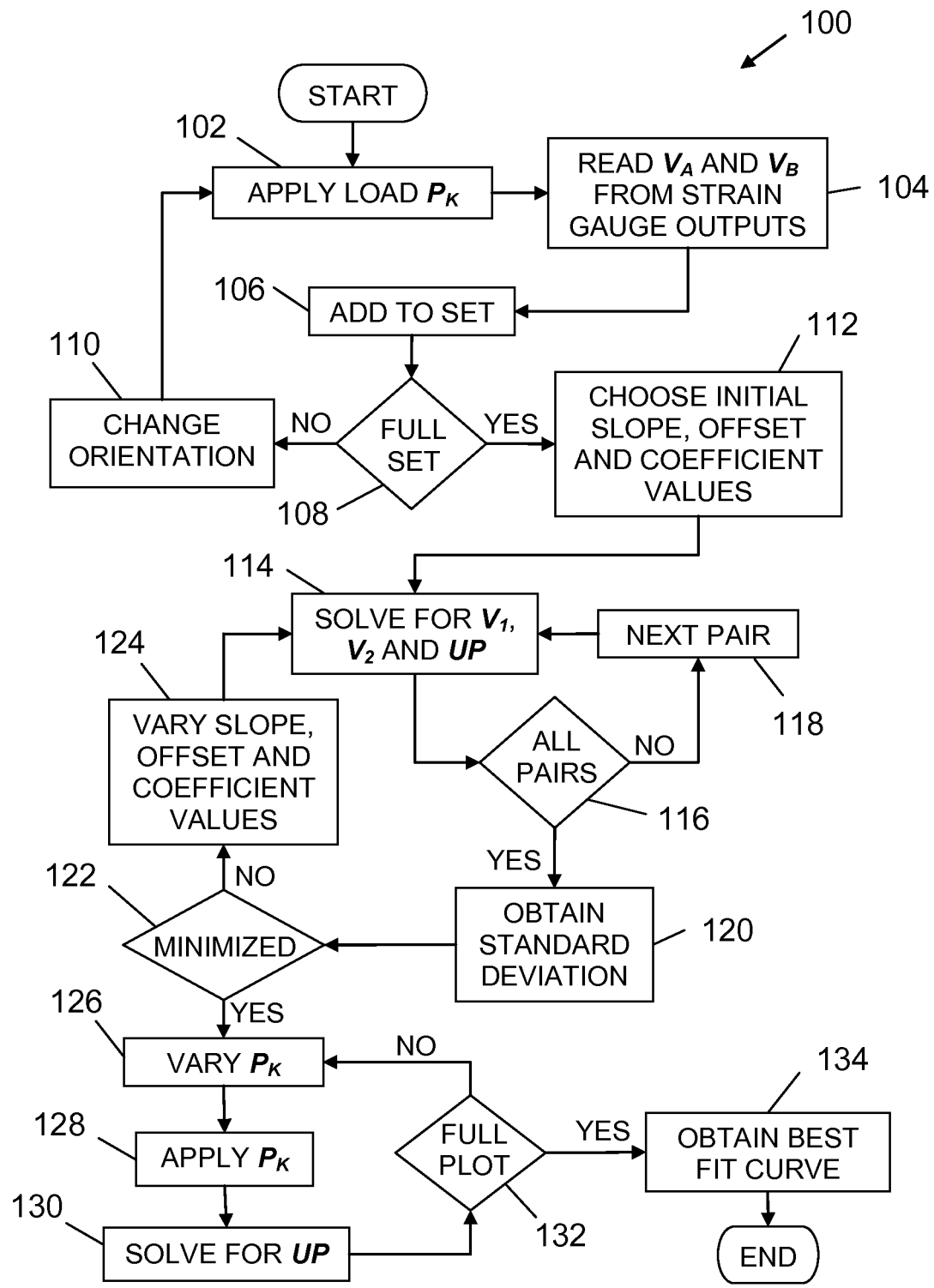
FIG. 4 is a block diagram of a method for designing and calibrating a sensor ring.

Referring now to FIG. 4, there is shown a block diagram of method 100 for designing and calibrating the sensor ring 10. With the sensor ring 10 fabricated in accordance with the design described hereinbefore with respect to FIGS. 1-3, a known load, $P_K$, is applied to the sensor ring 10, as shown at block 102.

At block 104, values for $V_A$ and $V_B$ are obtained from the outputs of the two pairs of the strain gauges 12. The obtained values are added to a set of values (block 106). If the set is not full, as determined at block 108, the orientation of load $P_K$ is changed at block 110 and, returning to block 102, load $P_K$ (at the new orientation) is applied to the sensor ring 10.

As described previously, a full set of values would include load $P_K$ applied at a plurality of orientations, so as to provide values for $V_A$ and $V_B$ representative of a full range of orientations about the sensor ring 10. The specific number of orientations and their distribution about the sensor ring 10 can vary depending on user preference.

If block 108 determines that the set of values is full, then initial values for slopes ($m_a$ and $m_b$), offsets ($b_a$ and $b_b$) and coefficients (A, B, and C) are chosen at block 112. Values for $V_1$, $V_2$ and UP are obtained at block 114 from Equations 16, 17 and 20, respectively, for each pair of outputs ($V_A$ and $V_B$). Once values for $V_1$, $V_2$ and UP are obtained for each pair of values for $V_A$ and $V_B$, as determined at blocks 116 and 118, the standard deviation of UP is obtained at block 120.

Values for slopes ($m_a$ and $m_b$), offsets ($b_a$ and $b_b$) and coefficients (A, B, and C) are iteratively varied and new values for $V_1$, $V_2$ and UP are obtained until the standard deviation is minimized, as shown at blocks 122 and 124. Once the standard deviation of UP is minimized, a correction for linearity can be obtained by plotting UP versus $P_K$.

If a plot has not been populated, as determined at block 126, load $P_K$ is varied (block 128) and this new load $P_K$ is applied to the sensor ring 10 (returning to block 102). This process is repeated until a plot of UP versus $P_K$ is populated sufficiently to determine a best fit curve at block 130, e.g., Equation [21].

Figure 5:
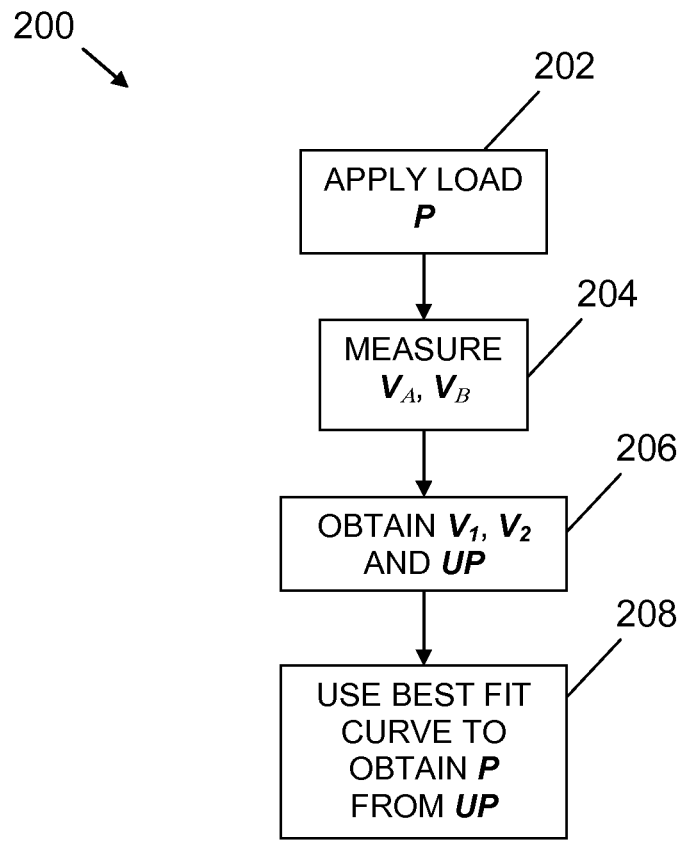
FIG. 5 is a block diagram of a method for use of a sensor ring calibrated in accordance with the method of FIG. 4.

Referring now to FIG. 5, there is shown a block diagram of method 200 for using the sensor ring 10 to measure forces exerted on the sensor ring. Once calibrated, as described with respect to FIG. 4, an unknown force, P, applied to sensor ring 10 (block 202), results in strain gauges 12 of sensor ring 10 providing outputs $V_A$ and $V_B$ (block 204). Using the slope, offset and coefficient values determined from the method 100, values for $V_1$, $V_2$ and UP are obtained from Equations [18], [19] and [22], respectively (block 206). The best fit curve, as determined from the method 100, is used to obtain the value of force P from the value determined for UP (block 208).

What have thus been described are systems and methods for the design and calibration of a sensor ring for measuring compressive forces exerted on tubular material during handling of the material. Pairs of strain gauges are placed in the ring in a configuration to measure the circumferential strain at two positions on the ring ninety degrees apart (resulting from bending of the ring as it is loaded in diametric compression).

The strain measurements are corrected and combined to recover the compressive force on the ring.

A method for calibrating and resolving the compressive force is independent of the angle of loading or sensor orientation as an input. Accordingly, resolution of the force from the strain gauge readings is possible—irrespective of the direction of the compressive force. The method further results in the reduction of sensor orientation errors.

As described previously herein, current sensor designs suffer from large orientation errors, typically greater than thirty degrees (one standard deviation). The above described design and calibration reduce the orientation error to less than ten percent—two standard deviations. The reduction in error can be ascribed to a number of factors, including configuring the strain gauges to measure circumferential strain at the ring at points ninety degrees apart from one another. Additionally, the equations derived and refined herein that combine the measured strains to recover the point load, as well as the method of calibration used to determine the optimum coefficients for use in the equations, lead to further error reductions.

It will be understood that many modifications and variations of the present invention may become apparent in light of the above considerations. For example, and as previously noted, many possible configurations and types of strain gauges can effectively measure strain inside a ring at two points. Any of these configurations can also be used for this sensor. Further, strain can be measured at two points on the outside of the ring, or even at points throughout the thickness of the ring.

Also, the ring comprising the sensor may be any size or thickness. Although strain is measured at two points ninety degrees apart; strain may also be measured at additional points to reduce error. For example, a sensor can measure strain every forty-five degrees and have multiple outputs. One pair of gauges can be calibrated separately from the other pair of gauges, but the point loads determined from each can be averaged to improve results and reduce error. The sensor is also equally applicable to tensile versus compressive loads on the ring.

It will be understood that many additional changes in the details, materials, and arrangement of parts, which have been herein described and illustrated in order to explain the nature of the invention, may be made by those skilled in the art within the principles and scope of the invention as expressed in the appended claims.

What is claimed is:

1. A method for calibrating a sensor ring by measuring a diametric compressive force on the sensor ring, said method comprising the steps of:

applying a known compressive load, $P_K$, at a plurality of orientations about the sensor ring such that the sensor ring is placed in diametric compression and there will be a bending moment through a thickness of the sensor ring from applying the load;

for each of the orientations about the ring, measuring a first output voltage, $V_A$, resulting from the bending moment, across first output connections from a first gauge of a first pair of strain gauges and from a second gauge of the first pair of gauges with the second gauge spaced apart one hundred and eighty degrees circumferentially on an interior of the ring;

for each of the orientations about the sensor ring, measuring a second output voltage, $V_B$, resulting from the bending moment, across second output connections from a first gauge of a second pair of strain gauges spaced ninety degrees apart circumferentially on the interior of the ring apart from the first gauge of the first pair of strain gauges, and from a second gauge of the second pair of strain gauges in which the second gauge of the second pair is spaced one hundred and eighty degrees apart from the first gauge of the second pair, the output voltages forming a set of paired first and second output voltages for the plurality of orientations;

initializing values of 1 for correction slopes $m_A$ and $m_B$;

initializing values of 0 for offsets $b_A$ and $b_B$;

for the set of paired output voltages, calculating a corresponding set of parameters, $V_1$ and $V_2$, based on respective relationships $V_1 = m_A V_A + b_A$ and $V_2 = m_B V_B + b_B$;

for the corresponding set of parameters, $V_1$ and $V_2$, calculating a set of uncorrected loads, UP to recover a point load directly, based on the relationship $$UP = \frac{-\left(\frac{4(V_1+V_2)}{\pi}\right) + \sqrt{\frac{16}{\pi^2}(V_1+V_2)^2 - 4\left(\frac{8-\pi^2}{\pi^2}\right)(V_1^2+V_2^2)}}{2\left(\frac{8-\pi^2}{\pi^2}\right)};$$

obtaining a standard deviation for the set of uncorrected loads;

iteratively varying values for at least one of $m_A$, $m_B$, $b_A$ and $b_B$ and returning to calculating corresponding sets of parameters, $V_1$ and $V_2$, sets of uncorrected loads, UP, and standard deviations;

minimizing, based on said iteration step, the standard deviations where A, B and C are constants based on the relationship $$UP = A(V_1+V_2) + \sqrt{B(V_1+V_2)^2 - C(V_1^2+V_2^2)}$$

selecting final values for $m_A$, $m_B$, $b_A$ and $b_B$, based on said step of minimizing the standard deviation step;

selecting final values representing the least standard deviation for coefficients A, B and C based on said minimizing of the standard deviation step;

iteratively varying load $P_K$;

returning to applying load $P_K$ to obtain a set of $P_K$ versus UP values;

determining a best fit curve for the set of $P_K$ versus UP values based on $P_k = M*UP + Y$ where M is the designated slope and Y is the designated offset;

calibrating the sensor ring for independent load analysis as a reference standard based on positioning orientation; and calibrating the sensor ring output based on deviations from linearity.

* * * * *